United States Patent [19]

Ishiguro

[11] 3,825,831

[45] July 23, 1974

[54] DIFFERENTIAL PULSE CODE MODULATION APPARATUS

[75] Inventor: Tatsuo Ishiguro, Tokyo, Japan

[73] Assignee: Nippon Electric Company, Limited, Tokyo, Japan

[22] Filed: Oct. 26, 1971

[21] Appl. No.: 192,198

[30] Foreign Application Priority Data

Oct. 28, 1970 Japan .............................. 45-95370

[52] U.S. Cl. ................. 325/38 B, 178/68, 325/141, 332/11 D, 340/345

[51] Int. Cl. .......................... H04b 1/00, H04b 7/00

[58] Field of Search ........ 325/13, 38 R, 38 A, 38 B, 325/141; 332/11 R, 11 D; 179/15 AZ, 15 AV, 15 BN; 178/68; 340/345; 235/152

[56] References Cited

UNITED STATES PATENTS

| | | | |
|---|---|---|---|
| 3,526,855 | 9/1970 | McDonald | 325/38 R |
| 3,610,901 | 10/1971 | Lynch | 235/152 |

OTHER PUBLICATIONS

Direct Feedback Coders: Design and Performance with Television Signals, Ralph C. Brainard & James C. Candy, Proc. of IEEE, Vol. 57 No. 5 May 1969, pp. 776–786.

*Primary Examiner*—Robert L. Griffin
*Assistant Examiner*—Marc E. Bookbinder
*Attorney, Agent, or Firm*—Sandoe, Hopgood & Calimafde

[57] ABSTRACT

A differential pulse code modulator includes a delta modulator for converting an analog input signal to a delta modulated signal, a digital filter for removing quantizing noise components, and a direct feedback pulse code modulation encoder. The feedback encoder includes a subtractor for determining the difference between a decoded digital signal and the output of the digital filter, a digital integrator for integrating the output of the subtractor, a digital coder for converting the output of the integrator to a differential pulse code modulation signal and a digital decoder for converting the differential signal to the decoded digital signal supplied to the subtractor. Clock pulses are supplied to the delta modulator, the digital filter, and the direct feedback pulse code modulation encoder.

2 Claims, 8 Drawing Figures

DIFFERENTIAL PULSE CODE MODULATION APPARATUS

BACKGROUND OF THE INVENTION

This invention relates to a differential pulse code modulation apparatus.

So-called differential pulse code modulation (DPCM) is suitable for an encoding system for a television signal or the like, in which a close correlation exists between mutually adjacent sampled values. THe DPCM coder and decoder require multilevel analog-to-digital (A/D) and digital-to-analog (D/A) converters which are complex inevitably and costly to manufacture. Pradman Kaul has proposed a DPCM coder in his paper entitled "Differential PCM Encoding of TV SIgnals Using A Digital Loop" (1970, ICC, 70-CP-202-COM, 2-16 to 2-11). This DPCM coder converts an input alalog signal into a PCM code by the usual A/D converter, and then converts the PCM code into a DPCM code by a digital circuit. This DPCM coder, however, requires an A/D converter of seven or eight bits and hence is costly to manufacture. To lower the cost of manufacture of the A/D converter, David Goodman has proposed a PCM coder in his paper entitled "The Application of Delta Modulation to Analog-to-PCM ENCODING" (BSTJ, Vol. 48, No. 2, Feb. 1969, pp. 321–342). This PCM coder uses a structurally simple, inexpensive delta modulation (ΔM ) coder for A/D conversion and, a digital filter and a digital integrator for converting the ΔM signal to the necessary PCM signal. Hence, by combining this type of PCM coder and the DPCM coder with a digital feedback loop, it becomes possible to realize an inexpensive DPCM coder.

SUMMARY OF THE INVENTION

According to this invention, further simplified DPCM coder is provided in which the process for converting a ΔM code into a PCM signal, as in the last mentioned DPCM coder, is omitted, whereby a DPCM signal is obtained directly from the ΔM signal.

Also, according to this invention, a DPCM coder is provided in which the digital filter installed between the ΔM coder and the digital coder has a specific transfer characteristic whereby the deterioration of the signal-to-noise ratio in ΔM/dpcm code conversion is lessen.

BRIEF DESCRIPTION OF THE DRAWINGS

The other objects, features and advantages of the invention will be apparent from the following detailed description taken in conjunction with the accompanying drawings, wherein.

DESCRIPTION OF THE PREFERRED EMBODIMENT

Figure 1:
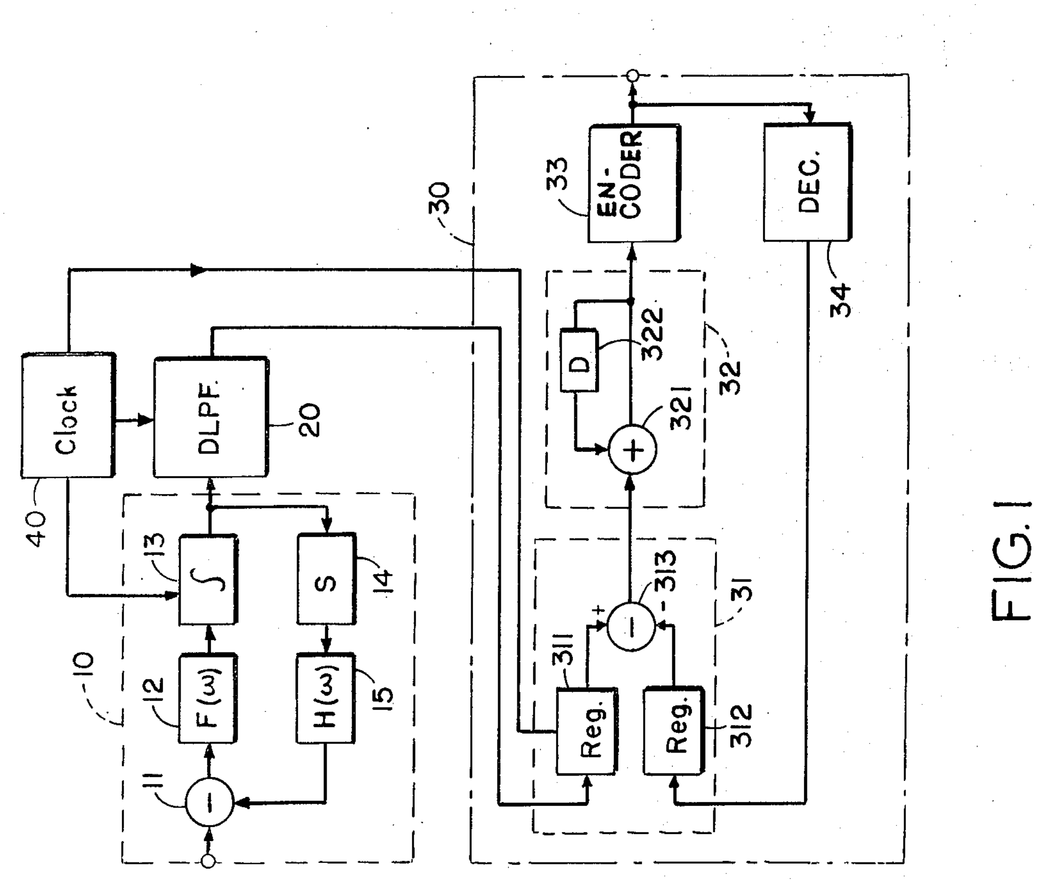
FIG. 1 is a block diagram showing a DPCM coder embodying this invention.

Referring to FIG. 1, the reference numeral 10 denotes a well known double integration type delta modulation encoder means for converting an input analog signal into a ΔM signal (See "Companded Delta Modulation For Telephony" by S. J. Brolin et al., IEEE Trans. on Communication Technology, vol. COM-16, No. 1, Feb. 1968, pp. 157–162, particularly FIG. 7 and its description on page 159). The ΔM coder 10 comprises a driving circuit 14 for producing voltage signals ±E or current signals ±I corresponding to the ΔM code "1" or "0", a first integrator means 15 with a transfer function H (ω) for integrating the output of the driving circuit 14 to produce a locally decoded signal, a differential amplifier 11 for producing a signal responsive to the difference between the input analog signal and the locally decoded signal, a second integrator means 12 for integrating the output of the differential amplifier 11, and an amplitude comparator 13 for generating the output codes "1" and "0" in response to the positive and negative polarities of the output of the integrator 12, respectively. By means of a digital filter 20, the quantizing noise of the ΔM code outside the transmission band is removed, and the ΔM code is converted into a linear DPCM signal in a form of a parallel-fed digital signal. The detailed construction and operation of the apparatus will be described below.

The parallel-fed digital signal is converted by a direct-feedback PCM (DF-PCM) coder 30 to a nonlinear DPCM signal. The sampling frequency of the ΔM coder is an integral multiple of the sampling frequency of the DF-PCM coder.

The output signal of the digital filter 20 is stored in a register 311 at each sampling period of the DF-PCM coder. The DF-PCM coder 30 comprises a digital subtractor means 31 including the register 311, another register 312 and a subtracting element 313; an integrator means 32 including an adder 321 and a register 322, for integrating the output of the digital subtractor means 31; a digital encoder means 33 for converting the output of the integrator means 32 to an output DPCM signal; and a digital decoder means 34 for converting the output DPCM signal to a locally decoded signal which is also stored in the register 312.

The ΔM coder 10, the digital filter 20 and the DF-PCM coder 30 are supplied with clock pulses from a clock pulse generator 40.

Figures 2A, 2B, 2C:
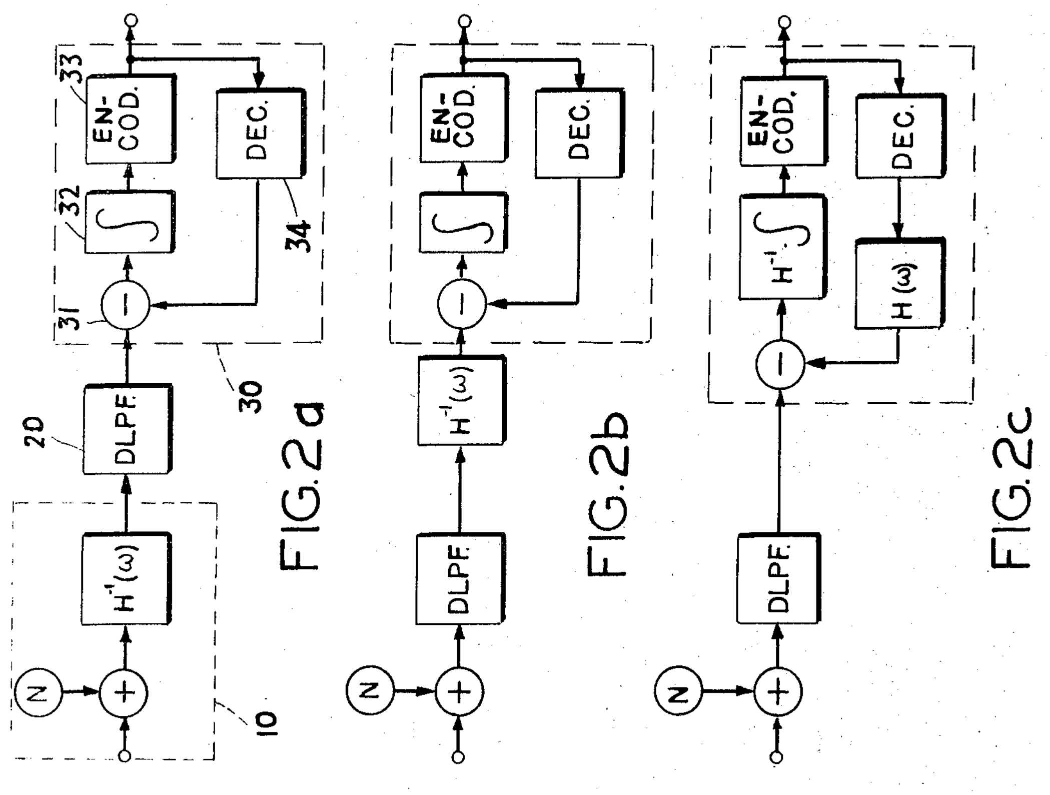
FIGS. 2(*a*), – 2(*c*) are block diagrams showing the operation of the DPCM coder of this invention.

For a better understanding of the performance of the DPCM coder of this invention, the details of the coder in FIG. 1 are shown in blocks in FIGS. 2(*a*) through 2(*c*). The equivalent circuit of the ΔM coder 10 includes, as shown in FIG. 2(*a*), a filter having a transfer characteristic $1/H(\omega)$ or $H^{-1}(\omega)$, a noise source N for producing a quantizing noise, and an adder wherein the quantizing noise is added to the input analog signal. Since the filter $H^{-1}(\omega)$ and the digital filter 20 can be interchanged, the coder shown in FIG. 2(*a*) is equivalent to that shown in FIG. 2(*b*). The quantizing noise is negligibly small if the sampling frequency of the ΔM coder is sufficiently high and if the attenuation outside the transmission band of the digital filter is large enough. By transferring the $H^{-1}(\omega)$ filter into the loop of the DF-PCM coder, an arrangement shown in FIG. 2(*c*) is obtained. Namely, FIG. 2(*c*) shows a DPCM coder in which the integrator characteristic of the local decoder is given by H(ω), as in the case of the ΔM coder. The fundamental construction of the DPCM coder is also shown in an article entitled "Direct-Feedback Coders: Design and Performance with Television Signals" by Ralph C. Brainard et al (Proc. of IEEE vol. 57, No. 5, May 1969, pp. 776–786, particularly FIG. 10 and the description on page 783).

Figure 3:
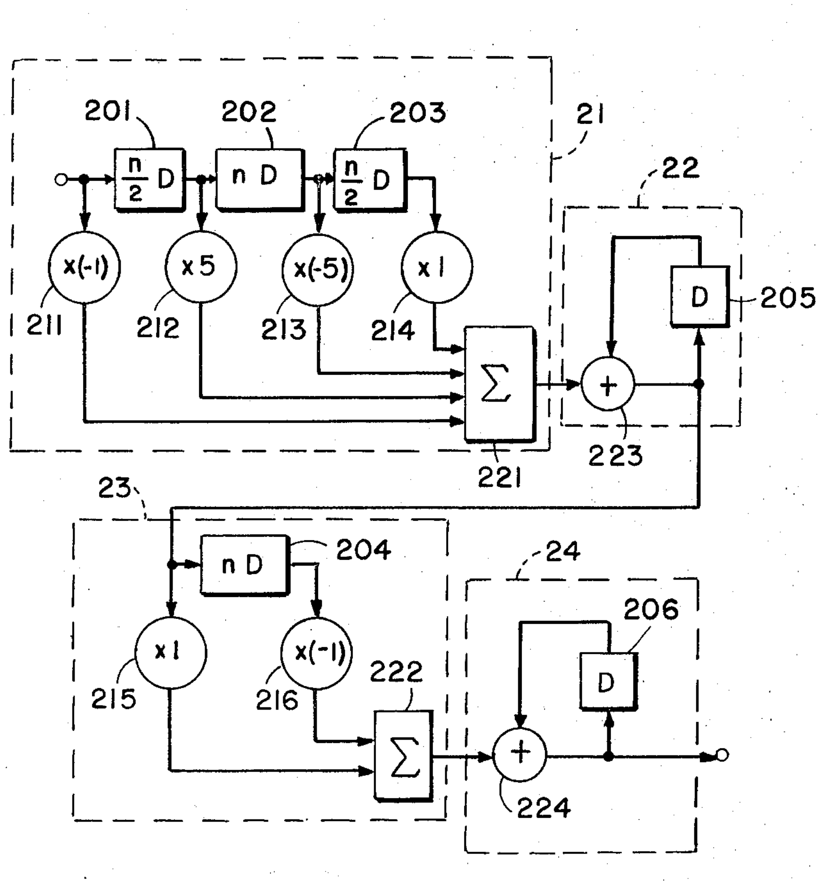
FIG. 3 is a block diagram showing a digital filter used for the purpose of this invention.

FIG. 3 shows in block form a novel construction of the digital low-pass filter 20 wherein reference numerals 21 and 23 denote four-tap and two-tap transversal filters, respectively; and reference numerals 22 and 24, denote two integrators. The transversal filter 21 includes shift registers 201, 202 and 203 of $n/2$, $n$ and $n/2$ stages respectively (where $n$ is assumed to be the ratio of the ΔM sampling frequency to the DF-PCM sampling frequency), by which the input ΔM code is delayed; serially connected multipliers 211, 212, 213 and 214 for multiplying the tap outputs by constants −1, 5, −5 and 1 respectively; and an adder 221 for summing up the outputs of said multipliers 211 through 214 and delivering a binary signal including, with each sampling period, a polarity indicating bit and information bits representative of the summed-up result. Similarly, the transversal filter 23 includes an $n$-stage shift register 204; multipliers 215 and 216 for multiplying the input and output signal of the shift register 204 by constants 1 and −1 respectively; and an adder 222 for summing up the outputs of the multipliers 215 and 216, and delivering a binary signal including, within each sampling period, a polarity-indicating bit and information bits representative of the summed-up results.

The transfer function $TF_1$ and $TF_2$ of the transversal filters 21 and 23 are expressed in $Z$-transform, as follows:

$$TF_1(Z) = -1 + 5 \cdot Z^{-n/2} - 5^{\cdot -3/2n} + Z^{-2n}$$
$$= Z^{-n/2 \cdot} (1 - Z^{-n}) \cdot [5 - (Z^{+n/2} + Z^{-n/2})] \qquad (1)$$

$$TF_2(Z) = (1 - Z^{-n}) \qquad (2)$$

where $Z^{-1}$ represents a unit delay corresponding to the sampling period of ΔM signal. The integrator 22, including a register 205 and an adder 223, is the same as the integrator 24 in its construction, which likewise includes a register 206 and an adder 224. The transfer functions $I_1$ and $I_2$ of the integrator 22 and 24 given by:

$$I_1 = I_2 = 1/(1 - Z^{-1}) \qquad (3)$$

The introduction of the Equations (1) through (3) is detailed in a paper entitled "On Digital Filtering" by C. M. Rader (IEEE Trans. on Audio and Electroacoustics, vol. AU-16, No. 3, Sept. 1968, pp. 303–314, particularly FIG. 3 and Equation 40).

From Equations (1) through (3), the transfer function $T(Z)$ of the digital filter 20 is expressed by:

$$T(Z) = TF_1 \cdot I_1 \cdot TF_2 \cdot I_2$$
$$= Z^{-n/2} \cdot [\,(1 - Z^{-n})/(1 - Z^{-1})\,]^2 \cdot [5 - (Z^{n/2} + Z^{-n/2})] \qquad (4)$$

The amplitude characteristic $A(f)$ of $T(Z)$ is obtained by substituting $e^{-j2\pi f/fs}$ for $Z^{-1}$ in Equation (4), and given by:

$$A(f) = 5\left[\frac{\sin \frac{f}{fc}\pi}{\sin \frac{f}{fs}\pi}\right]^2 \left(1 - \frac{2}{5}\cos \pi \frac{f}{fc}\right) \qquad (5)$$

where $f$ is signal frequency; $fc$, the sampling frequency of DF-PCM coder; and $fs$, the sampling frequency of ΔM coder.

Figure 4:
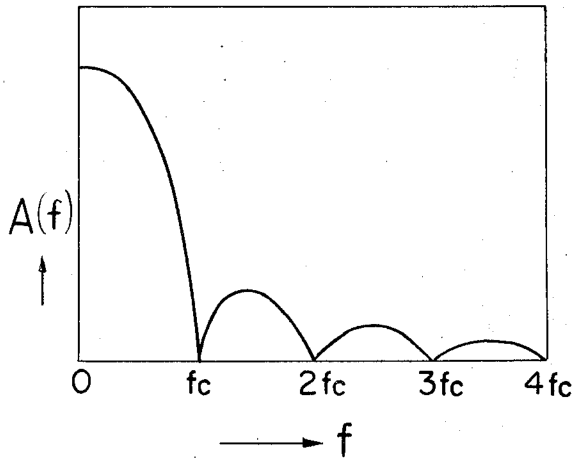
FIG. 4 is a graphic diagram showing the transfer characteristic of the digital filter of FIG. 3.

FIG. 4 illustrates the amplitude characteristic of the digital filter 20, given by Equation (5). According to this amplitude characteristic, a sine function is included in the numerator of the equation for the transfer function whereby the transfer characteristic is made zero (that is, the attenuation is made infinite) at frequencies that are integral multiples of the sampling frequency $fc$. This feature is given by the term $(1-Z^{-n})$ in Equations (1) and (2).

The output signal of the digital filter 20 includes the sampling frequency $fs$ components and is sampled in the digital subtractor means 31 by a sampling pulse with frequency $fc$, supplied from the clock pulse generator 40. As a result, the noise components outside the transmission band are converted to noise components inside the transmission band due to the aliasing effect. Therefore, the noise components in the vicinity of the frequencies of integral multiples of $fc$ are converted to low frequency noise components in the vicinity of zero frequency. Since the decoder operates as an integrator for the low frequency components, the low frequency components are accumulated by the decoder. The above-mentioned amplitude characteristic of the digital filter 20 is effective to avoid signal-to-noise ratio deterioration of the output DPCM code due to the accumulation of the noise components near the zero frequency. Particularly, in television signals, it is desirable to lower the low frequency noise components because human eyes are sensitive to low frequency noise.

Figure 5:
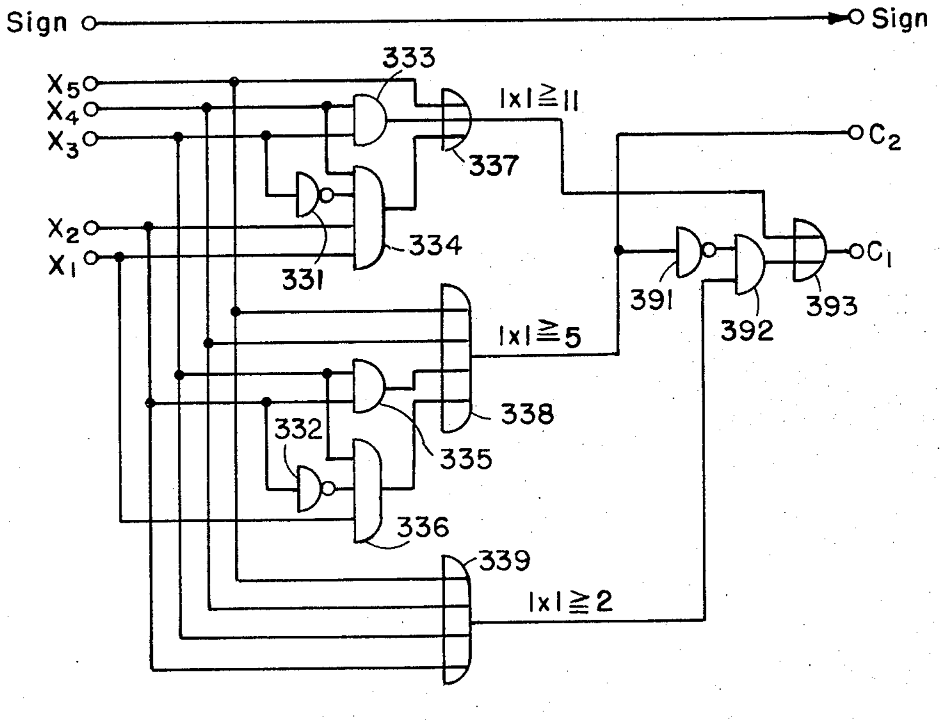
FIG. 5 is a circuit diagram showing an example of the digital encoder means.

FIG. 5 shows a specific example of the digital encoder means 33 of FIG. 1. The principal construction of DF-PCM coder 30 is well-known and disclosed, for example, in the above mentioned article by Ralph C. Brainard et al (Particularly FIG. 1 and the description on page 776). The digital encoder means 33 receives a parallel code signal including, in each digit, a polarity-indicating bit (SIGN) and information bits ($x_5\,x_4\,x_3\,x_2\,x_1$). By the logic circuit including inverters 331 and 332, AND gates 333 to 336, and OR gates 337 to 339, the outputs of the OR gates 337, 338 and 339 indicate that the absolute amplitudes ($X$) of the information bits have the following conditions, respectively:

$|X| \geqq 11$,
$11 > |X| \geqq 5$ and
$5 > |X| \geqq 2$.

The code pulses $C_1$ and $C_2$ obtained by an inverter 391, an AND gate 392 and an OR gate 393, are delivered together with the polarity-indicating bit as the output DPCM signal. The relationship between the input information bits and the output code are shown in the following Table 1.

TABLE 1

| \|X\| | \|X\|≧11 | 11>\|X\|≧5 | 5>\|X\|≧2 | 2>\|X\| |
|---|---|---|---|---|
| $C_1C_2$ | 11 | 01 | 10 | 00 |

Figure 6:
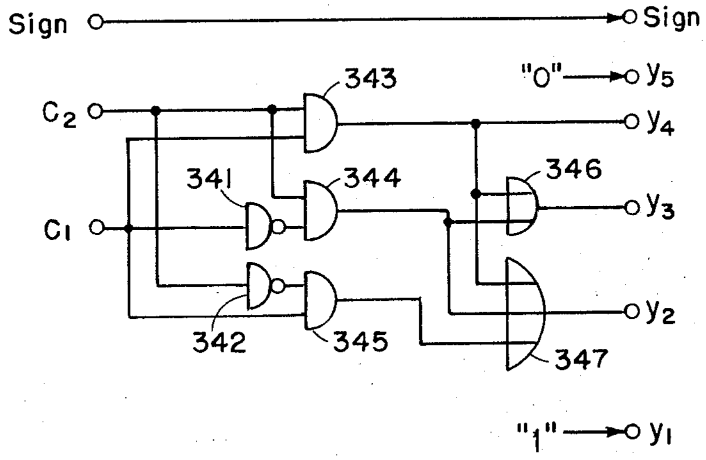
FIG. 6 is a circuit diagram showing an example of the digital decoder means.

FIG. 6 shows a specific example of the digital decoder means 34. The output DPCM signal is applied to the input side of this circuit. The polarity-indicating bit is carried directly to the output side. The code pulses $C_1$ and $C_2$ are converted to information bits $y_4$ $y_3$ $y_2$ through inverters 341 and 342, AND gates 343 and 345, and OR gates 346 and 347. The remaining bits $y_5$ and $y_1$ are always "0" and "1", respectively. The relationship between the code pulses ($C_1$ $C_2$) and the decoded information bits ($y_5$ $y_4$ $y_3$ $y_2$ $y_1$) are shown in the following Table 2.

TABLE 2

| $C_1C_2$ | 11 | 01 | 10 | 00 |
|---|---|---|---|---|
| $y_5y_4y_3y_2y_1$ | 01111 | 00111 | 00011 | 00001 |
| $\|Y\|$ | 15 | 7 | 3 | 1 |

(where $|Y|$ means an absolute value of the code $y_5$ $y_4$ $y_3$ $y_2$ $y_1$.) The absolute values $|Y|$ are typical values of the respective range of $|X|$ as indicated in Table 1.

According to the exemplary embodiment of the invention described above, an inexpensive, highly accurate and stable DPCM coder can be realized by using a ΔM coder, a digital filter and a DF-PCM coder. Variations and modification of the preferred embodiment that are within the spirit and scope of the invention will, of course, occur to those skilled in the art. Reference should made to the claims below to determine the meets and bounds of the invention.

What is claimed is:

1. A non-linear differential pulse code modulation signal processing apparatus comprising:

delta modulator means for converting an analog input signal to a delta modulated signal having a clock frequency determined by clock pulses supplied thereto;

digital filter circuit means for receiving the delta modulated signal, removing quantizing noise components that fall outside a predetermined transmission band from the delta modulated signal, and for converting the delta modulated signal into a differential pulse code modulation signal;

a direct feedback pulse code modulation encoder that operates at a sampling frequency equal to the clock frequency divided by a positive integer for converting the differential pulse code modulation signal into a non-linear differential pulse code modulation signal, including subtractor means for determining the difference between a decoded digital signal and the differential pulse code modulation signal from the digital filter means, a digital integrator means for integrating the output of the subtractor means, a digital encoder means for converting the output of the integrator means to a non-linear differential pulse code modulation signal, and a digital decoder means for converting the non-linear differential pulse code modulation signal to the decoded digital signal supplied to the subtractor means; and means for supplying clock pulses to the delta modulator means, the digital filter means, and the direct feedback pulse code modulation encoder.

2. The apparatus set further in claim 1, wherein the digital filter has a transfer function that takes the value zero at frequencies equal to an integral multiple of the sampling frequency of the direct feedback pulse-code modulation encoder.

* * * * *